United States Patent
Smith et al.

[15] 3,649,045
[45] Mar. 14, 1972

[54] FLUID SUPPLY DEVICE FOR VEHICLE SAFETY SYSTEM

[72] Inventors: William M. Smith, Simsbury; Francis N. Wrobel, Wethersfield, both of Conn.

[73] Assignee: The Ensign-Bickford Company, Simsbury, Conn.

[22] Filed: Jan. 27, 1970

[21] Appl. No.: 6,163

[52] U.S. Cl. ........................... 280/150 AB, 23/281, 222/5, 102/39
[51] Int. Cl. ................................................ B60r 21/10
[58] Field of Search ............... 280/150 AB; 23/281; 102/34.5, 102/37.7, 39, 40; 222/5

[56] References Cited

UNITED STATES PATENTS

| | | |
|---|---|---|
| 3,532,360 | 10/1970 | Leising et al. .......................... 280/150 |
| 373,529 | 11/1887 | Lombard ................................ 102/40 |
| 1,553,826 | 9/1925 | Lawrence ............................... 102/39 |
| 2,459,687 | 1/1949 | Decker .................................. 102/37.7 |
| 2,779,281 | 1/1957 | Maurice et al. ......................... 102/39 |
| 2,850,291 | 9/1958 | Ziccardi ................................ 280/150 |
| 3,089,418 | 5/1963 | Stiefel ................................... 102/39 |
| 3,532,359 | 10/1970 | Teague et al. .......................... 280/150 |

*Primary Examiner*—Kenneth H. Betts
*Attorney*—Prutzman, Hayes, Kalb & Chilton

[57] ABSTRACT

A multistage pyrotechnic gas generator for deploying a passenger confinement of a vehicle safety system comprises a support member having an ignition inlet and first and second stage compartments mounted on the support and having separate gas outlets, the first and second stage compartments containing gas-generating pyrotechnic material. The gas-generating pyrotechnic material in each stage comprises distinct primary and secondary pyrotechnic charges ignitable sequentially. The primary pyrotechnic charge of the first stage is in communication with the ignition inlet while the secondary pyrotechnic charge of each stage is disposed between the primary charge and the gas outlet for ignition by the primary charge. The pyrotechnic material used in the secondary charge of each stage has a cooling effect on the temperature of the gas generated by the primary charge and gas generation is controlled by the inclusion of time delay lines between the primary charges of adjacent stages to assure sequenced ignition of the gas-generating stages.

12 Claims, 6 Drawing Figures

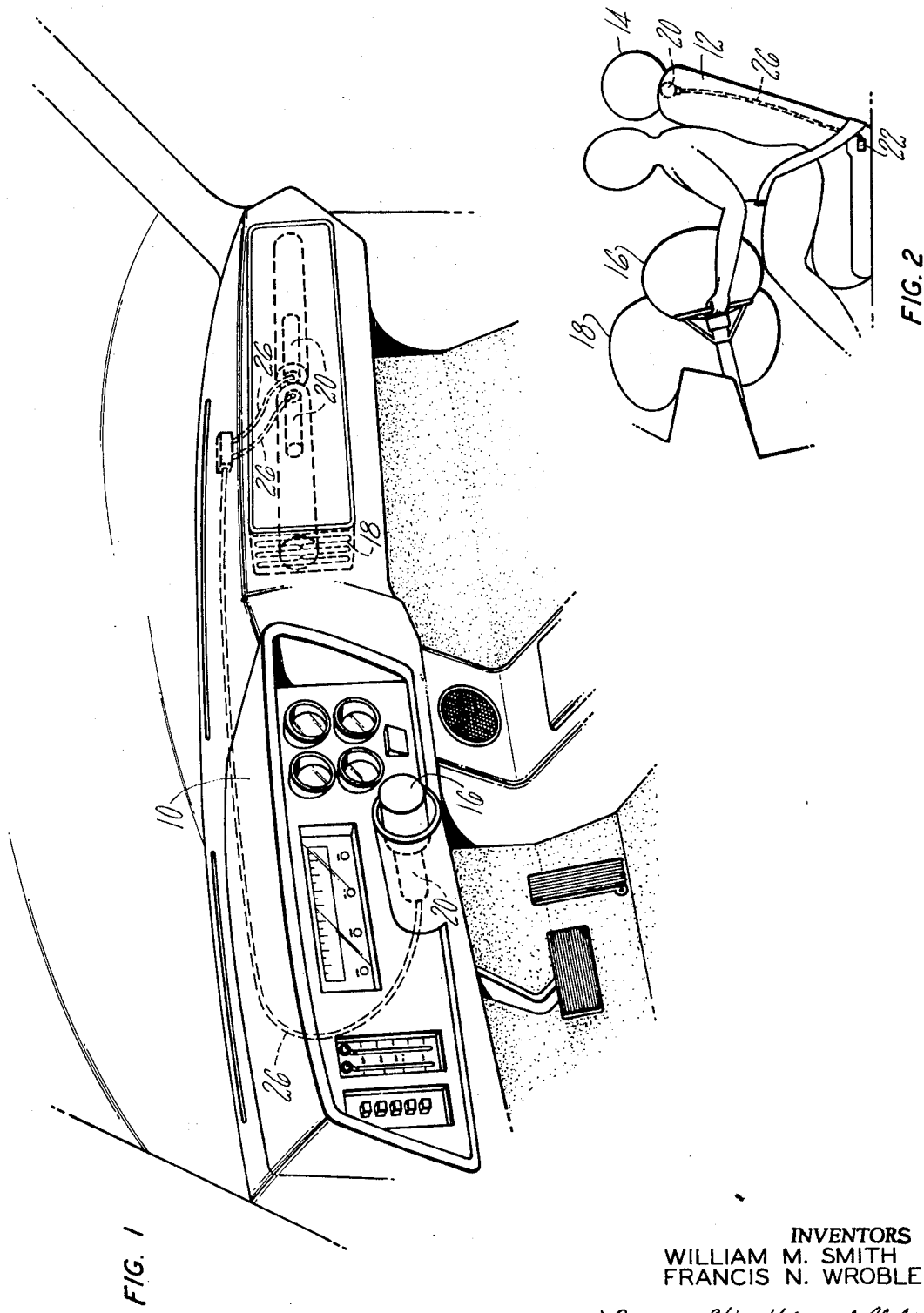

FLUID SUPPLY DEVICE FOR VEHICLE SAFETY SYSTEM

BACKGROUND AND SUMMARY OF THE INVENTION

The present invention relates generally to a passenger-restraining safety system for vehicles and is more particularly concerned with a new and improved fluid supply device for rapidly deploying an inflatable passenger confinement of a vehicle safety system.

In recent years increased emphasis has been placed on safety devices for protecting the occupants of a vehicle in the event the vehicle is involved in a collision. One such device is an inflatable confinement installed in a deflated condition within the passenger compartment of a vehicle such as an automobile or the like. The inflatable confinement is readily deployable for restraining sudden injurious movement of a passenger resulting from the collision. In such devices the inflatable confinement is generally stored within the dashboard or similar nonobstructive location and is operatively associated with a fluid source, such as a cylinder of compressed gas, which can be quickly opened to inflate the confinement upon the occurrence of a collision.

The cylinder of compressed gas generally is opened by an explosive charge. However, when this occurs it has been found that the released fluid or gas tends to surge out of the container at a high kinetic energy and in a relatively uncontrolled manner. This has the effect of hurling the restraining member at the passenger in an undesirable fashion. Baffle systems may be employed to alleviate this problem but are not fully effective since they add substantially to the size of the device and at the same time tend to delay slightly the deployment of the passenger confinement. This is particularly important in systems of this type where full deployment must be completed in less than about 100 milliseconds. Additionally, such systems may remain unused for a number of years and unnoticed leaks in the fluid storage vessel may render the system ineffective.

Accordingly, it is a primary object of the present invention to provide a fluid supply device for an inflatable safety system wherein the device is capable of extremely rapid yet controlled release of the fluid to the inflatable passenger-confining member of the system.

Another object of the present invention is to provide a fluid supply which obviates the possibility of fluid leakage as a result of prolonged storage prior to use. Included in this object is the provision for a gas-developing system which generates the gas at the time of its need while at the same time providing sequential and controlled release thereof to the inflatable passenger confinement of the system.

Still another object of the present invention is to provide a pyrotechnic gas generator of multistage construction having sequential initiation of the various stages thereof yet being capable of fully deploying the passenger confinement within a total lapsed time period in the millisecond range.

A still further object of the present invention is to provide a new and improved pyrotechnic gas generator of the type described in the form of a small and compact yet highly durable and reliable unit.

Other objects will be in part obvious and in part pointed out more in detail hereinafter.

These and related objects are accomplished in accordance with the present invention by providing a multistage pyrotechnic gas generator for deploying a passenger confinement of a vehicle safety system. The gas generator comprises a support member having an ignition inlet, first and second stage compartments mounted on the support and having separate gas outlets and first and second stage gas-generating pyrotechnic material within the first and second stage compartments, respectively. Each stage of the gas-generating material comprises distinct primary and secondary pyrotechnic charges ignitable sequentially. The primary pyrotechnic charge of the first stage is in communication with the ignition inlet while the secondary pyrotechnic charge of each stage is disposed between the primary charge and the gas outlet for ignition by the primary charge. The pyrotechnic material used in the secondary charge of each stage preferably has a cooling effect on the temperature of the gas generated by the primary charge and gas generation is controlled by the inclusion of time delay lines between adjacent stages to assure sequenced ignition of the gas-generating stages.

A better understanding of the objects, advantages, features, properties and relationships of the invention will be obtained from the following detailed description and accompanying drawings which set forth illustrative embodiments and are indicative of the various ways in which the principle of the invention is employed.

BRIEF DESCRIPTION OF THE DRAWINGS

In the drawings:

FIG. 1 is a perspective view of the frontal structural portion of an automobile passenger compartment schematically illustrating a typical inflatable safety system installed therein prior to deployment;

FIG. 2 is a schematic side elevational view of the compartment of a motor vehicle illustrating the safety system after deployment in response to operation of the gas generator of the present invention;

DESCRIPTION OF THE PREFERRED EMBODIMENTS

Figure 5:
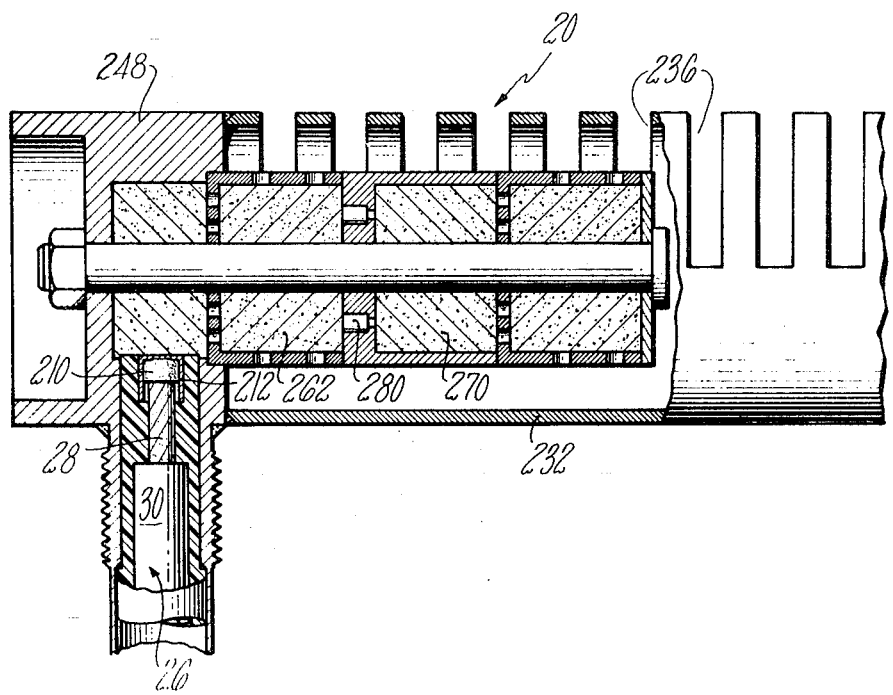
FIG. 5 is a sectional view of still another embodiment of the gas generator of the present invention mounted within a cylindrical gas diffuser.

Referring now to the drawings in greater detail wherein like reference numerals indicate like parts throughout the several figures, the pyrotechnic gas generator of the present invention is illustrated as incorporated in an inflatable safety system installed within a passenger compartment of an automobile. It will, of course, be appreciated that the invention is adaptable to other diversified uses capable of benefiting from the unique features possessed by the gas generator of the present invention. However, for clarity of description and ease of understanding the invention will be described in connection with its preferred uses within an automobile inflation safety system and particularly in connection with an explosive signal transmission system such as the system described in greater detail in the copending U.S. Pat. application of Thomas W. Norton, Ser. No. 6111 filed Jan. 27, 1970, and assigned to the same assignee as this application.

The passenger restraining system may be incorporated in the dashboard 10, in other structural components generally located in front of the occupant of the vehicle or as a part of the headrest structure secured to the passenger seat 12. As illustrated in FIGS. 1 and 2, the system includes a plurality of inflatable restraining confinements or pillows suitably stored in a deflated condition both in front of and behind the occupants of the vehicle. These restraining members may take the form of an inflatable headrest 14, a steering post cushion 16, a passenger restraining shield 18 or other suitably configured member to provide the desired passenger confinement and protection from injury upon collision of the vehicle.

Each inflatable confinement of the system includes a suitable gas delivering device, generally designated 20, positioned immediately adjacent or within the inflatable confinement and adapted for actuation upon receipt of an appropriate signal from an impact sensor 22. The gas delivering device of the present invention takes the form of a pyrotechnic gas generator adapted for ignition by a pyrotechnic igniter 24 (see FIGS. 3 and 4) associated with a suitable signal transmission line 26. In the particular system used for illustrative purposes, the signal transmission line is a flexible detonating cord comprising an explosive core 28 (see FIGS. 5 and 6) encased in a covering 30 capable of confining the products of detonation and preventing their escape into the passenger compartment of the vehicle.

It will be understood that other signal transmission lines such as electrical wires may be used effectively for this purpose, but generally it is preferred that the entire system be independent of the electrical system of the vehicle.

As mentioned, the activation of the system is controlled by a sensing device 22 adapted for immediate response to a predetermined acceleration-force condition such as might occur when the vehicle is involved in a collision. In FIG. 1 only a single sensing device 22 is illustrated as being associated with one or more inflatable passenger confinements. However, a plurality of sensors responsive to different directional forces could be operatively connected to a single inflatable restraining device, particularly where it would be advantageous to provide an extra mechanism of slightly different impact sensitivity as a "backup" for the primary device.

The multistage pyrotechnic gas generator 20 of the present invention is generally secured within a suitable gas distributing housing mounted in communicable relationship with the interior of the inflatable restraining pillow for rapid delivery of the gas thereto. The entire gas generator and housing may even be located entirely within the pillows although generally it is preferred that it be positioned exteriorly thereof. In the particular embodiment illustrated in FIG. 3, the housing is an elongated hollow cylinder 32 having a planar flange portion 34 extended outwardly from one end thereof and defining an arcuate gas diffusing vent 36 communicating with the interior of an inflatable pillow. This type of housing might be used, for example, within the steering column of an automobile in the manner illustrated in FIGS. 1 and 2. In that way the gas generator is positioned entirely outside the inflatable pillow. The cylindrical housing readily receives a pyrotechnic multistage gas generator 20 and is spaced therefrom along a portion of its length to provide a suitable gas flow passage or conduit 38 to the vent 36.

The gas generator 20 consists of a plurality of cylindrical charge-carrying canisters coaxially stacked on each other in end-to-end relationship and supportably mounted on an axially extending support post or column 42 extending axially along substantially the entire length of the gas generator, each pair of canisters forming a separate stage of the generator. The support post 42 is provided with an axial aperture 44 at one end thereof for threadably receiving a conventional pyrotechnic igniter 24 or other suitable actuating member responsive to the signal-transmitting detonating cord 26 of the system. Each canister is centrally apertured to receive the post 42 while base canister 48 is fixedly secured to the housing 32 by fasteners 50. The post 42 is provided with an outwardly extending radial shoulder 52 adjacent the end aperture 44 and a plurality of circumferentially spaced radial ports 54 communicating with the aperture 44. The shoulder 52 abuts the base canister 48 and limits axial movement of the post relative to the canister 48 and housing 32. At the same time the shoulder 52 positions the circumferentially spaced ignition inlet ports 54 in communicative relationship with the primary pyrotechnic charge 56 housed within the ring-shaped compartment 58 defined by the base canister 48.

Figure 3:
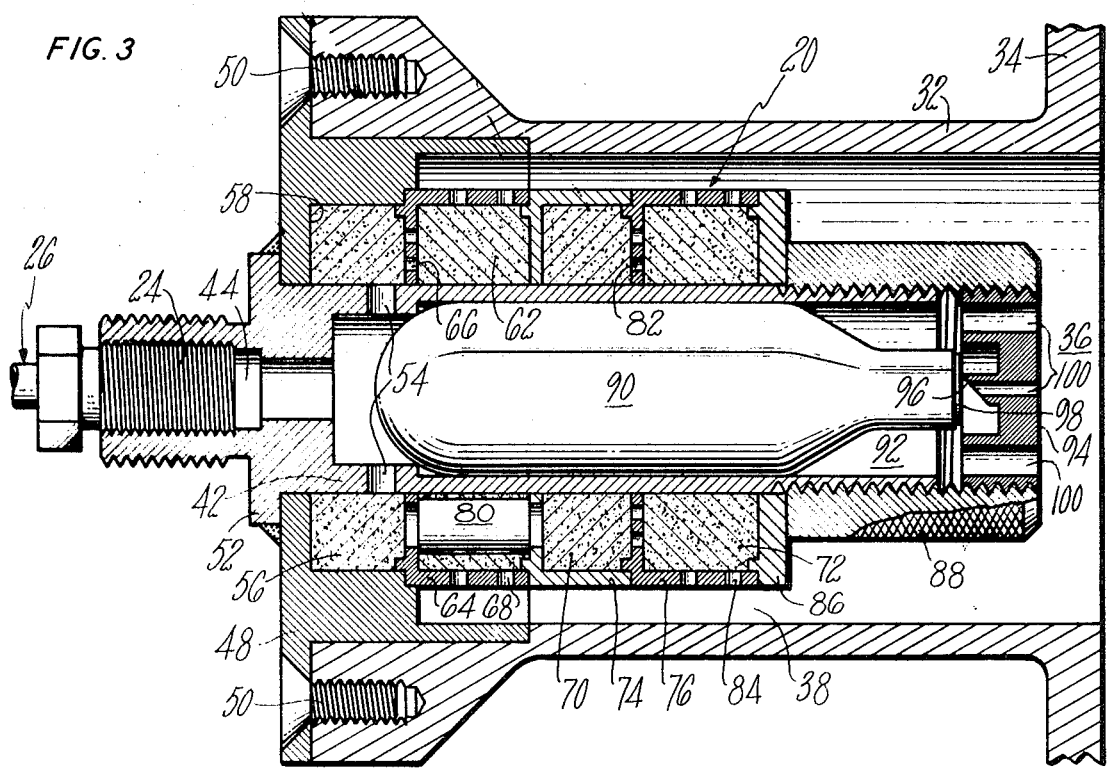
FIG. 3 is a sectional view of one embodiment of a gas generator of the present invention provided with an auxiliary fluid supply cylinder.

In the preferred embodiments illustrated, each gas-producing stage of the generator consists of a pair of interconnected primary and secondary pyrotechnic gas-generating charges. In FIG. 3 the secondary charge 62 of the first stage is contained within a cylindrical canister 64 nestably mounted on base canister 48. The canister 64 is provided with a plurality of communicating apertures 66 in its base for permitting ignition of the secondary gas-generating charge by the primary charge and a plurality of circumferentially spaced ports 68 in its generally cylindrical peripheral side wall to permit gas delivery from the first stage of the gas generator. Similarly, each additional stage of the gas generator is comprised of distinct primary and secondary charges 70 and 72 housed in different yet interconnected canisters, such as cylindrical canisters 74 and 76, respectively.

Each succeeding stage is isolated from the secondary charge of the preceding stage, but is operatively connected to the primary charge thereof by means of one or more pyrotechnic delay lines 80, the intercommunication being provided between the primary pyrotechnic charges of each stage of the gas generator. Thus, the cup-shaped canister 64 for the secondary charge of the first stage is fully traversed by the delay columns 80 of boron-red lead which provide precise control over ignition of the gas generator's second stage. As clearly shown, the primary and secondary charge canisters 74, 76 of the second stage are mounted in superimposed interfitting relationship with the first stage and the canister 76 is provided with communicating apertures 82 in its base and gas outlet ports 84 in its cylindrical side walls.

Although only two pyrotechnic gas-generating stages are illustrated in the embodiment shown in FIG. 3, it will be appreciated that additional stages may be provided if desired. The final pyrotechnic stage of the stacked configuration is provided with a cover plate 86 which is firmly secured thereon by means of a retaining nut 88 threadably secured to the end of central supporting column 42 opposite the igniter receiving end.

The primary gas-generating pyrotechnic charge used in each stage of the generator of the present invention is a compact particulate material. The material should be highly effective in producing large volumes of gaseous combustion products from a minimum amount of material in an extremely rapid manner. Black powder has been found eminently well suited to fulfilling these qualifications. Although gas of high temperature will result from the combustion of black powder, it is a feature of the present invention that the secondary charge acts as a coolant to quickly drain away or dissipate some of the excess heat prior to delivery of the gas to the inflatable pillow. In this connection a secondary charge consisting of ammonium nitrate or mixtures thereof have been found to consistently operate with good success. A typical mixture contains 95 percent ammonium nitrate and 5 percent carbon black.

Thus, it will be understood that actuation of a pyrotechnic igniter positioned within aperture 44 will effect ignition of the black powder primary charge 56 of the first stage. This in turn will ignite both the ammonium nitrate secondary charge 62 and the boron-red lead delay columns 80 extending therethrough. The gas generated by the primary and secondary gas-generating pyrotechnic charges of the first stage will produce an initial quantity of gas for discharge through the ports 68 of canister 64 into the passage 38 for delivery to an inflatable passenger confinement by the vent 36. The time delay columns can be selected to provide any desired delay before ignition of the secondary stage. However, when the gas generator is used in a safety device system of the type described, it is generally preferred that the delay be limited to only a few milliseconds so as to assure complete deployment of the inflatable passenger confinement prior to substantial movement by the passenger in response to the collision condition. As will be appreciated, the delay column 80 extending longitudinally of the gas generator will ignite the primary charge 70 of the second stage and thereby provide a continued yet controlled gas production in accordance with the sequenced ignition of the various stages of the gas generator.

It is an additional feature of the present invention that the pyrotechnic gas generator may be combined, where desired, with an auxiliary fluid supply to assure maintenance of an appropriate pressure within the inflatable confinement for a period of time subsequent to full deployment thereof. As shown in FIG. 3, this auxiliary fluid supply is provided by a small cylinder 90 of compressed gas or the like located within an enlarged central cavity 92 of the support column 42. The cavity 92 communicates with the igniter aperture 44 at one end and is closed at the opposite end by an adjustably positionable punch cap 94 having an inwardly extending punch tip 96 positioned immediately adjacent the rupturable end 98 of the cylinder. The punch cap 94 includes a plurality of gas outlet ports 100 providing communication between the central cavity 92 and the gas-diffusing vent 36 of the housing. The cylinder of compressed gas positioned within the central cavity is adapted for slidable axial movement under the propelling force of the igniter 24 causing the end 98 thereof to be driven into the tip 96 of the punch thereby opening the cylinder and permitting flow of gas through ports 100 toward the inflatable passenger confinement of the safety system.

Figure 4:
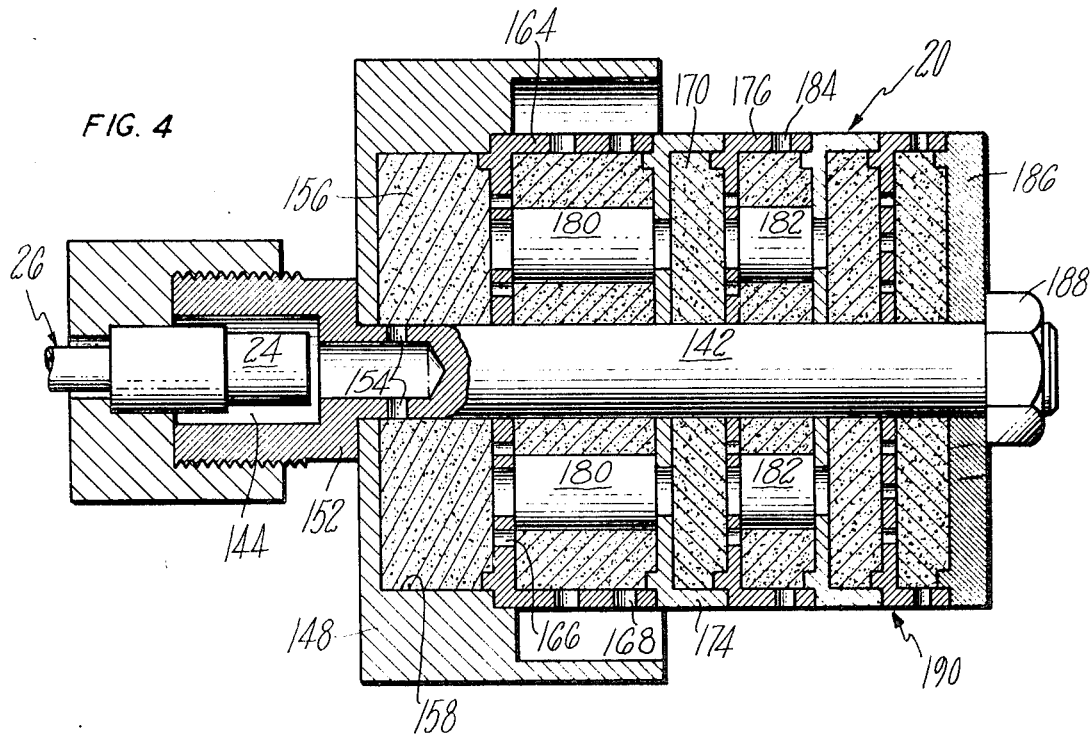
FIG. 4 is a sectional view similar to FIG. 3 illustrating another embodiment of the gas generator.

Referring now to FIG. 4, there is illustrated another embodiment of the pyrotechnic gas generator of the present invention. In this embodiment an axially extending center support post or column 142 confinably supports a cylindrical three-stage gas generator adapted for enclosure within a suitable gas-diffusing housing (not shown). The generator includes a plurality of nested, centrally apertured canisters similar to those illustrated in FIG. 3. The generally cup-shaped base canister 148 rests upon the radially extending shoulder 152 of the support column in such a manner that an igniter-receiving opening 144 communicates with the primary charge cavity 158 of the gas generator's first stage through a transversely extending initiating inlet 154. A generally cylindrical cup-shaped secondary charge canister 164 is nestably received by the base 148 and completes the first stage of the gas generator. The secondary charge canister 164 is suitably apertured at 166 to provide pyrotechnic communication between the primary and secondary charges of the first stage while the exterior cylindrical wall of the secondary charge canister is provided with a plurality of circumferentially spaced gas outlet ports 168 for exhausting the gas generated within the first stage of the generator.

A second stage of shorter axial dimension relative to the first stage is nestably received on the secondary charge canister 164 of the first stage. A primary charge canister 174 of the second stage fully separates that stage from the secondary charge of the first stage but is operatively interconnected with the primary charge 156 of the first stage through a pair of columns 180 containing pyrotechnic delay material such as a boron-red lead mixture. The secondary charge canister 176 of the second stage is apertured at 182 to provide pyrotechnic communication between the charges of the second stage and further includes a plurality of gas outlet ports 184 spaced about the periphery thereof. As mentioned, a third and final stage 190 of similar construction to the second stage is nestably secured to the second stage in overlying axial relationship therewith and communicates with the primary charge 170 of the second stage through time delay columns 182. The third stage in turn is enclosed by a circular cap member 186 firmly secured thereon by a retaining nut 188 threadably mounted on the free end of the support column 142.

Referring now to FIG. 5, there is illustrated still another embodiment of the present invention in the form of a two-stage pyrotechnic gas generator of generally cylindrical configuration. In this embodiment the base canister 248 of the first stage is provided with a laterally extending side sleeve 254 centrally apertured for receiving a suitable pyrotechnic initiator responsive to a signal received by the signal transmitting detonating cord 26. As shown, the initiator consists of a single ignition charge 210 such as titanium-aluminum red lead enclosed in a metal shell 212 and in operative communication with the core 28 of the detonating cord 26. The housing for the gas generator is an elongated generally cylindrical tube 232 having a plurality of gas venting and diffusing slots 236 spaced along the length thereof. The construction of the gas generator is similar to the embodiments shown in FIGS. 3 and 4, with the exception that in this embodiment the delay lines 280 are located between the secondary charge 262 of the first stage and the primary gas-generating charge 270 of the second stage. In this arrangement a slightly greater delay time is attained between the gas discharge of each stage since the delay lines leading to the second stage are not ignited until the secondary charge of the first stage is already operatively producing and dispensing gas from its gas outlet ports 236.

Figure 6:
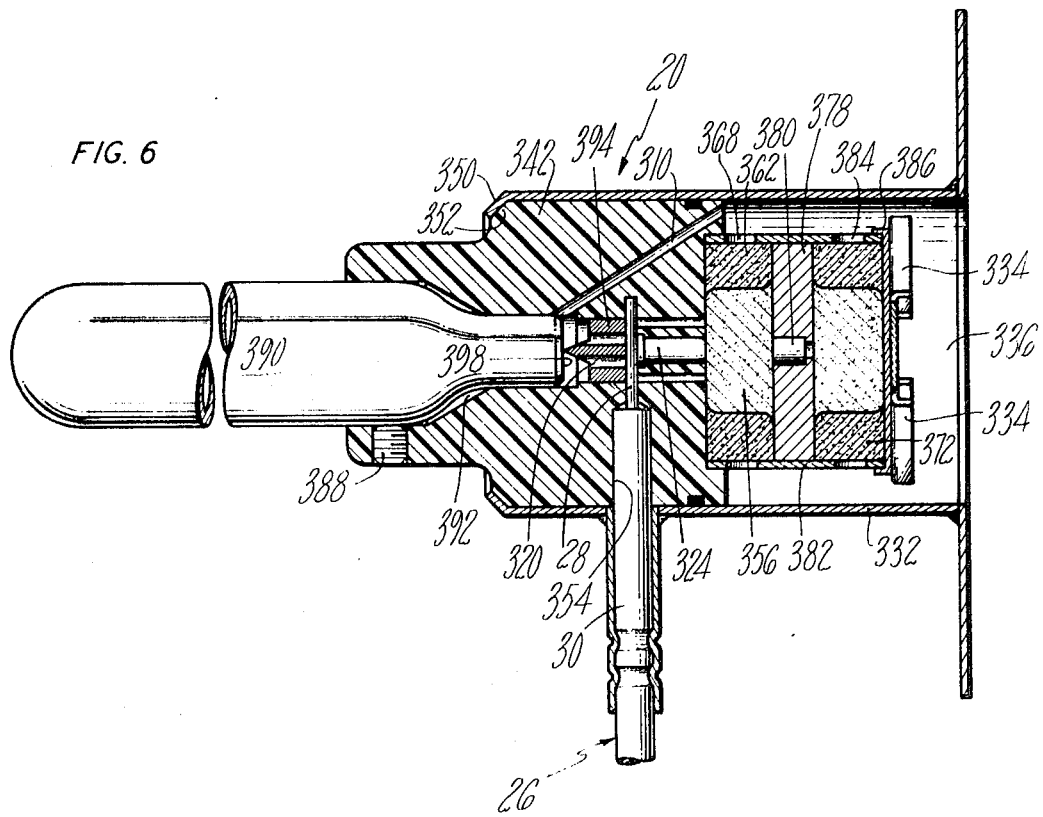
FIG. 6 is a sectional view of a further embodiment of the gas generator of the present invention.

Referring now to FIG. 6, there is shown still another embodiment of the pyrotechnic gas generator of the present invention. In this embodiment the housing is a cylinder 332 similar to that described in FIG. 3 while the supporting column 342 is an enlarged block of suitable support material filling the full cross-sectional area of the housing for a distance of about one-half its length. The end 350 of the housing furthest removed from the gas venting port 336 is crimped over the tapered shoulder 352 of the supporting column for securely retaining the column within the housing. The supporting column is provided with an axially extending wide mouth cavity 392 adapted to receive the rupturable end 398 of an auxiliary fluid supply cylinder 390 which is securely attached therein by a set screw 388. A side aperture 354 in the support column 342 communicates with the axial cavity 392 and receives therein a signal transmission detonating cord 26, the explosive core 28 thereof extending into and intersecting the axial cavity 392 of the supporting column. Interposed between the explosive core 28 and the auxiliary fluid supply cylinder 390 is a suitably configured punch 394 slidably mounted within the cavity 392 for movement toward the end 398 of the cylinder. Also positioned within the axial cavity 392 of the support column but on the opposite side of the detonating cord from the punch 394 is a suitable pyrotechnic initiator 324 which in this embodiment takes the form of a cartridge blank.

The gas-generating pyrotechnic charges in the embodiment illustrated in FIG. 6 are arranged concentrically, with the primary gas-generating charge 356 of the first stage located centrally within the first stage compartment in operative relationship with the cartridge blank initiator 324 while the secondary gas-generating charge 362 fully circumscribes the primary charge and is in intimate contact therewith. A suitable spacer member 378 carrying a short length of a pyrotechnic delay column 380 separates the substantially identical first and second stages of the gas generator, both stages being confined within an elongated tubular casing 382. Two sets of circumferentially spaced ports 368 and 384 are provided in casing 382 in contact with the respective secondary charges 362 and 372 of the first and second gas-generating stages. A circular cover 386 encloses the second stage and is held against axial movement by the intersecting retaining flanges 334 securely affixed to the walls of the cylindrical housing 332 in spaced relationship to the gas venting port 336.

Thus, detonation of the signal transmitting cord will fire the cartridge blank 324 and simultaneously drive the punch 394 toward the auxiliary fluid supply cylinder 390. The cartridge will ignite the primary black powder charge 356 of the first stage which in turn will initiate the secondary charge 362 and light the pyrotechnic delay line 380 between the first and second stages. The second stage will ignite in a similar manner with the gas produced by both stages flowing into the inflatable pillow through the common venting port 336. The gas from the auxiliary fluid supply cylinder will exhaust through either the gas conduits 310 in the support column or through apertures 320 in the punch 394 thereby trailing the gas from the first and second stages toward the venting port 336 in the housing.

Thus it can be seen from the foregoing detailed description that the present invention provides a multistage pyrotechnic gas-generating device capable of rapid yet controlled delivery of gas to a passenger confinement of a vehicle safety system. The gas generator is a compact unit capable of rapid response and full actuation within a total lapsed period of about 10 milliseconds. At the same time the gas generation is sequentially controlled yet rapidly dispersed.

As will be apparent to persons skilled in the art, various modifications, adaptations and variations of the foregoing specific disclosure can be made without departing from the teachings of the present invention.

We claim:

1. A multistage pyrotechnic gas generator for deploying a passenger confinement of a vehicle safety system comprising a support member having an ignition inlet; first and second stage compartments mounted on said support, each compartment having a separate gas outlet; first and second stage gas-generating material within said first and second stage compartments respectively, each stage of said gas-generating material comprising distinct primary and secondary pyrotechnic charges, the primary pyrotechnic charge of said first stage being in communication with said ignition inlet, the secondary pyrotechnic charge of each stage being disposed between the primary charge and the gas outlet for ignition by only its respective primary charge, said secondary charge being effective to reduce the temperature of the gas generated by the primary charge, the secondary charge of said first stage being pyrotechnically isolated from the secondary charge of said second stage.

2. The gas generator of claim 1 wherein the support member includes a generally cylindrical support column extending axially of the generator and a compartment-retaining member secured to the support column, the compartments including cylindrical charge-confining wall portions assembled in coaxial alignment, said portions confining said secondary charges having a plurality of circumferentially spaced gas outlets, the gas generator including time delay means disposed between the primary charges of said first and second stages to effect ignition of said second stage subsequent to ignition of said first stage.

3. The gas generator of claim 1 wherein the first and second stage compartments are stacked in overlying relationship and the primary and secondary charges of each stage are disposed coaxially.

4. The gas generator of claim 1 wherein the primary and secondary charges are arranged concentrically with the secondary charges being disposed outwardly of the primary charges.

5. The gas generator of claim 1 wherein each compartment includes primary and secondary charge containers in stacked overlying relationship, said containers providing communication therebetween for ignition of the secondary charge by the primary charge.

6. The gas generator of claim 1 including a pyrotechnic delay column of predetermined burning rate extending longitudinally of said support member and interconnecting primary charges of immediately adjacent gas-generating stages.

7. The gas generator of claim 1 wherein the primary pyrotechnic charge consists essentially of black powder and the secondary charge is an endothermic pyrotechnic material.

8. The gas generator of claim 7 wherein the secondary charge includes ammonium nitrate.

9. The gas generator of claim 1 including an auxiliary fluid supply reservoir and fluid flow control means for opening the reservoir upon ignition of the pyrotechnic gas generator.

10. The gas generator of claim 9 wherein the reservoir is a rupturable gas cylinder and the fluid flow control means is a punch for rupturing the cylinder, said punch and cylinder being relatively movable for rupturing the cylinder upon ignition of the gas generator.

11. The gas generator of claim 1 wherein the support member includes a generally cylindrical support column having an opening for receiving a pyrotechnic igniter and an axial cavity communicating with said opening, said generator including an auxiliary fluid supply reservoir supportably mounted within said cavity for release of fluid therefrom upon actuation of the igniter.

12. The gas generator of claim 1 including a cylindrical housing having gas diffusing vent means, the support member including a base portion for the first stage secured at one end of the housing, said base portion providing a cup-shaped canister for the primary charge of the first stage, the first stage compartment further including a second cup-shaped canister for the secondary charge disposed in overlying supported relationship to said base and having gas outlet ports communicating with said vent means, and retaining means for maintaining said cup-shaped canisters in secure assembled relationship with the support member and the housing.

* * * * *